(12) United States Patent
Kim et al.

(10) Patent No.: US 11,101,752 B2
(45) Date of Patent: Aug. 24, 2021

(54) TORQUE RIPPLE COMPENSATION APPARATUS AND METHOD

(71) Applicant: HYUNDAI MOBIS CO., LTD., Seoul (KR)

(72) Inventors: In Hyuk Kim, Yongin-si (KR); Kyu Ha Kim, Yongin-si (KR); Hyeon Hee Jeong, Yongin-si (KR); Jeong Hoon Seo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 17 days.

(21) Appl. No.: 16/794,460

(22) Filed: Feb. 19, 2020

(65) Prior Publication Data

US 2020/0274467 A1 Aug. 27, 2020

(30) Foreign Application Priority Data

Feb. 21, 2019 (KR) ........................ 10-2019-0020285

(51) Int. Cl.
*H02P 6/10* (2006.01)
*B62D 5/04* (2006.01)

(52) U.S. Cl.
CPC .............. *H02P 6/10* (2013.01); *B62D 5/0472* (2013.01)

(58) Field of Classification Search
CPC ...... H02P 6/10; H02P 8/18; H02P 8/32; H02P 23/04; B62D 5/0472; B62D 5/046; B62D 5/0463; B62D 6/10; B60Y 2400/307
See application file for complete search history.

(56) References Cited

U.S. PATENT DOCUMENTS

| | | | | |
|---|---|---|---|---|
| 6,049,182 A * | 4/2000 | Nakatani | ............... | H02P 6/10 318/254.2 |
| 6,927,548 B2 * | 8/2005 | Nishizaki | ............. | B62D 5/0472 318/432 |
| 8,150,580 B2 * | 4/2012 | Suzuki | ............... | B62D 5/046 701/42 |
| 10,589,779 B2 * | 3/2020 | Sugawara | ........... | B62D 5/0463 |
| 10,693,395 B2 * | 6/2020 | Lee | ................. | B62D 15/021 |
| 2018/0065661 A1* | 3/2018 | Kim | ................. | B62D 5/0472 |
| 2019/0158004 A1* | 5/2019 | Pramod | ............. | H02P 6/10 |

FOREIGN PATENT DOCUMENTS

| | | |
|---|---|---|
| JP | 2008-273391 | 11/2008 |
| JP | 2009-292413 | 12/2009 |
| JP | 2017-099232 | 6/2017 |
| KR | 10-2016-0098890 | 8/2016 |

* cited by examiner

*Primary Examiner* — Bickey Dhakal
(74) *Attorney, Agent, or Firm* — H.C. Park & Associates, PLC

(57) ABSTRACT

A torque ripple compensation apparatus including a torque measurement unit configured to output torque measured through a torque sensor of an MDPS system; a motor speed measurement unit configured to output motor speed measured through a position sensor of an MDPS motor; a control unit configured to separately output an offset signal and a torque ripple signal based on the motor speed information and the measured torque information; and a torque ripple compensation unit configured to synthesize a plurality of torque ripple signals outputted from the control unit, and output a torque ripple compensation signal as a motor control signal to the MDPS motor, the torque ripple compensation signal being used to compensate for the synthesized torque ripple signal.

12 Claims, 5 Drawing Sheets

TORQUE RIPPLE COMPENSATION APPARATUS AND METHOD

CROSS-REFERENCE TO RELATED APPLICATION

The application claims priority from and the benefit of Korean Patent Application No. 10-2019-0020285, filed on Feb. 21, 2019, which is hereby incorporated by reference for all purposes as if fully set forth herein

BACKGROUND

Field

Exemplary embodiments of the present invention relate to a torque ripple compensation apparatus and method, and more particularly, to a torque ripple compensation apparatus and method for reducing torque ripple which occurs when a motor of an MDPS (Motor Driven Power Steering) system of a vehicle is driven.

Discussion of the Background

An MDPS system of a vehicle provides a part of steering torque which a driver needs to apply to a steering wheel when steering the vehicle, using an auxiliary power source, and thus, enables the driver to easily perform steering.

The MDPS system determines traveling conditions of the vehicle through a column torque sensor configured to measure the driver's column torque inputted to the steering wheel, a steering angle sensor configured to measure a steering angle or steering angular speed of the steering wheel, and a vehicle speed sensor configured to measure a vehicle speed, and provides assist torque through an electric motor (MDPS motor) based on the column torque applied to a steering shaft as the driver operates the steering wheel.

In general, the MDPS motor is implemented as a 3-phase AC motor, and an electronic control unit (ECU) of the MDPS system receives current in three phases outputted to the MDPS motor through feedback, and controls an inverter to output a 3-phase AC current through proportional integral (PI) control, in order to control the driving of the MDPS motor. However, when the MDPS motor is driven, torque ripple or mechanical vibration may occur due to a mechanical structure based on the number of poles in a rotor or the number of slots in a stator. Since such motor torque ripple reduces the NVH (Noise, Vibration, Harshness) performance of the MDPS system, improvement is required.

As a method for preventing such torque ripple, a method has been conventionally used, which compensates for torque ripple based on a lookup table, compensates for torque ripple using a system transfer function and a filter, or compensates for torque ripple based on a torque sensor.

However, the lookup table-based motor (MDPS motor) control method, in which a parameter extracted through a specific offline experiment is used for motor control, may be easily applied to the MDPS motor control, but has a problem in that a separate test time may be required for the parameter extraction, and a performance deviation may occur due to system distribution.

Furthermore, an active disturbance compensation method uses a disturbance observer to estimate and compensate for torque ripple (mechanical vibration) which occurs in the MDPS system. The disturbance observer estimates lumped disturbance of the system using a filter and an inverse transfer function of a normal system, and the performance of the disturbance observer is decided according to the design of the filter. At this time, when the filter is designed as a low-pass filter to estimate torque ripple which is generated in the form of a trigonometric function, magnitude reduction and phase delay may occur.

When a high pass filter is used to remove an offset of the torque sensor as in the torque ripple compensation method based on the torque sensor, an additional operation is required to correct distortion of a high frequency signal. Moreover, although the signal correction is performed, it may be difficult to recover an original signal. Furthermore, parameter estimation through integration requires a long convergence time, and an additional algorithm is required to block divergence of an integration signal.

Therefore, there is a need for a method capable of reducing torque ripple without causing the above-describe problems.

The related art of the disclosure is disclosed in Korean Patent Application Laid-Open No. 10-2016-0098890 laid-open on Aug. 19, 2016 and entitled "MDPS System and Method for Vehicles".

The above information disclosed in this Background section is only for enhancement of understanding of the background of the invention and, therefore, it may contain information that does not constitute prior art.

SUMMARY

Exemplary embodiments of the present invention provide a torque ripple compensation apparatus and method for reducing torque ripple which occurs when a motor of an MDPS (Motor Driven Power Steering) system of a vehicle is driven.

An exemplary embodiment of the present invention provides a torque ripple compensation apparatus including: a torque measurement unit configured to output torque measured through a torque sensor of an MDPS system; a motor speed measurement unit configured to output motor speed measured through a position sensor of an MDPS motor; a control unit configured to separately output an offset signal and a torque ripple signal based on the motor speed information and the measured torque information; and a torque ripple compensation unit configured to synthesize a plurality of torque ripple signals outputted from the control unit, and output a torque ripple compensation signal as a motor control signal to the MDPS motor, the torque ripple compensation signal being used to compensate for the synthesized torque ripple signal.

The torque ripple signal may include at least a primary torque ripple signal and a secondary torque ripple signal.

The control unit may include: a ripple frequency generation unit configured to generate a torque ripple frequency using the motor speed; a torque signal model application unit configured to generate a torque ripple estimated signal of the torque ripple frequency by applying a torque signal model to the torque ripple frequency; a torque estimation unit configured to estimate ripple torque from the generated torque ripple estimated signal, and output the estimated torque; a torque difference calculation unit configured to calculate a difference between the ripple torque estimated by the torque estimation unit and the measured torque acquired by the torque measurement unit by comparing the ripple torque and the measured torque; a gain application unit configured to multiply a gain set by a gain setting unit by the calculated torque difference, and output the multiplication result; and a torque ripple element output unit configured to apply the signal, to which the gain is applied by the gain application unit, to the estimated signal, and generate a corrected estimated signal including all torque ripple elements.

The measured torque signal and the ripple frequency may be sampled and generated in each designated control period.

The torque signal model may be a matrix model, and an offset, torque ripple 1 and torque ripple 2 may be distinguished according to an order which is set when the matrix model is made.

The torque ripple element may include an offset, torque ripple 1, and torque ripple 2.

The torque ripple compensation apparatus may feed back the corrected estimated signal to the torque signal model application unit in order to reflect the corrected estimated signal into the calculating of a torque estimation value.

Another exemplary embodiment of the present invention provides a torque ripple compensation method may include: outputting torque measured through a torque sensor of an MDPS system; outputting motor speed measured through a position sensor of an MDPS motor; separately outputting, by a control unit, an offset signal and a torque ripple signal based on the motor speed information and the measured torque information; and synthesizing, by a torque ripple compensation unit, a plurality of torque ripple signals outputted from the control unit, and outputting a torque ripple compensation signal as a motor control signal to the MDPS motor, the torque ripple compensation signal being used to compensate for the synthesized torque ripple signal.

The separately outputting of the offset signal and the torque ripple signal may include, by the control unit: generating a torque ripple frequency using the motor speed; generating a torque ripple estimated signal of the torque ripple frequency by applying a torque signal model to the torque ripple frequency; estimating torque from the generated torque ripple estimated signal, and outputting the estimated torque; calculating a difference between the estimated ripple torque and the measured torque by comparing the estimated ripple torque and the measured torque; multiplying a preset gain by the calculated torque difference, and outputting the multiplication result; and generating a corrected estimated signal including all torque ripple elements by applying the gain-applied signal to the estimated signal.

The torque signal model may be a matrix model, and an offset, torque ripple 1, and torque ripple 2 may be distinguished according to an order which is set when the matrix model is made.

The torque ripple elements may include an offset, torque ripple 1, and torque ripple 2.

The torque ripple compensation method may further include feeding back the corrected estimated signal to the applying of the torque signal model to the torque ripple frequency, in order to reflect the corrected estimated signal to calculation of a torque estimation value.

The measured torque signal τ may be modeled with an offset and torque ripple as expressed by Equation 1 below:

$$\tau = \alpha_0 + \alpha_1 \sin(N_1\theta_m + \phi_1) + \ldots + \alpha_n \sin(N_n\theta_m + \phi_n)$$

where a constant $\alpha_0$ represents the offset, a trigonometrical function $\alpha_i \sin(N_i\theta_m + \phi_i)$ represents the torque ripple where i=1, 2, ..., n, $\theta_m$ represent a motor rotation angle, $N_i\theta_m$ represent a harmonic component with respect to the motor rotation angle, and $\alpha_i$ and $\phi_i$ represent the magnitude and phase of the torque ripple, respectively.

The measured torque signal and the ripple frequency are sampled and generated in each designated control period.

In accordance with the inventive concepts, the torque ripple compensation apparatus and method can reduce torque ripple which occurs when the motor of the MDPS system of the vehicle is driven.

Furthermore, the torque ripple compensation apparatus and method can improve a steering feel at low speed through the torque ripple compensation.

Furthermore, the torque ripple compensation apparatus and method can be applied to real-time torque ripple compensation logic without a separate compensation parameter extraction process.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
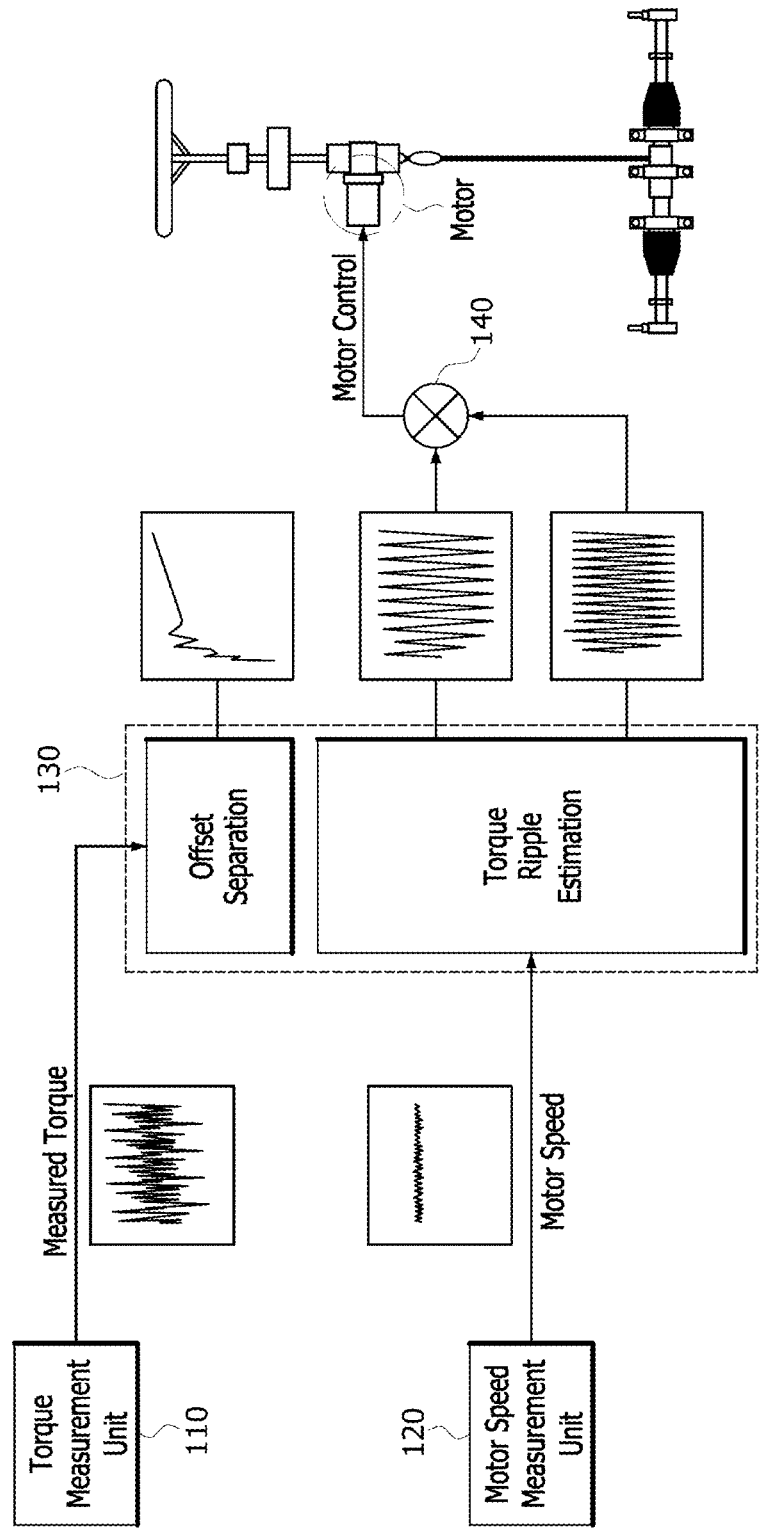
FIG. 1 is a diagram illustrating a schematic configuration of a torque ripple compensation apparatus in accordance with an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a torque ripple compensation apparatus and method in accordance with the present disclosure will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the disclosure into account and can be changed according to the custom or intention of users or operators. Therefore, definition of the terms should be made according to the overall disclosures set forth herein.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

In general, torque ripple of a motor (for example, an MDPS motor) is one of several factors that may cause an uncomfortable steering feel in a low-speed steering section of an MDPS system.

Therefore, the present invention provides a method capable of reducing torque ripple of a motor through a control technique that can estimate and compensate for torque ripple in real time.

FIG. 1 is a diagram illustrating a schematic configuration of a torque ripple compensation apparatus in accordance with an exemplary embodiment of the present invention. The torque ripple compensation apparatus includes a torque measurement unit 110, a motor speed measurement unit 120, a control unit 130, and a torque ripple compensation unit 140.

The torque measurement unit 110 outputs torque measured through a torque sensor (not illustrated) of an MDPS system.

The motor speed measurement unit 120 outputs motor speed measured through a position sensor (not illustrated) of the MDPS motor.

The control unit 130 separately outputs an offset signal and a torque ripple signal based on the motor speed information and the measured torque information.

At this time, the torque ripple signal includes at least primary and secondary torque ripple signals.

The torque ripple compensation unit 140 synthesizes the primary or secondary torque ripple signal outputted from the control unit 130, and outputs a torque ripple compensation signal as a motor control signal to the motor, i.e. the MDPS motor, the torque ripple compensation signal being used to compensate for the synthesized primary or secondary torque ripple signal.

Figure 2:
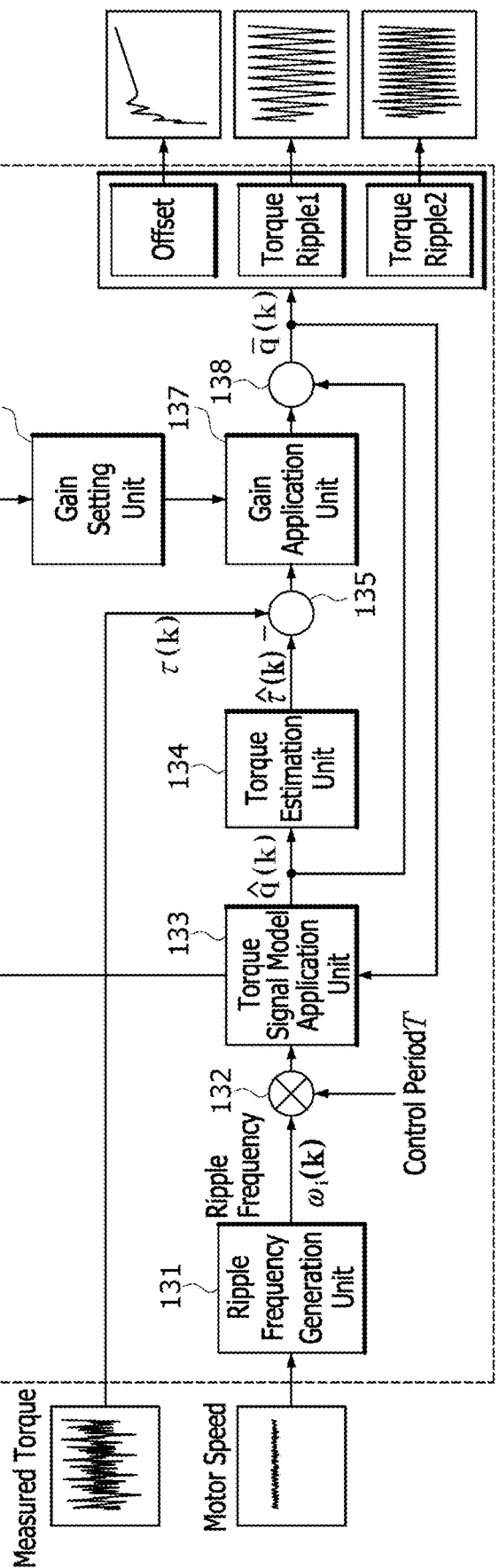
FIG. 2 is a diagram illustrating the detailed configuration of a control unit in FIG. 1.

FIG. 2 is a diagram illustrating the detailed configuration of the control unit in FIG. 1.

As illustrated in FIG. 2, the control unit 130 includes a ripple frequency generation unit 131, a control period setting unit 132, a torque signal model application unit 133, a torque estimation unit 134, a torque difference calculation unit 135, a gain setting unit 136, a gain application unit 137, and a torque ripple element output unit 138.

Figure 3:
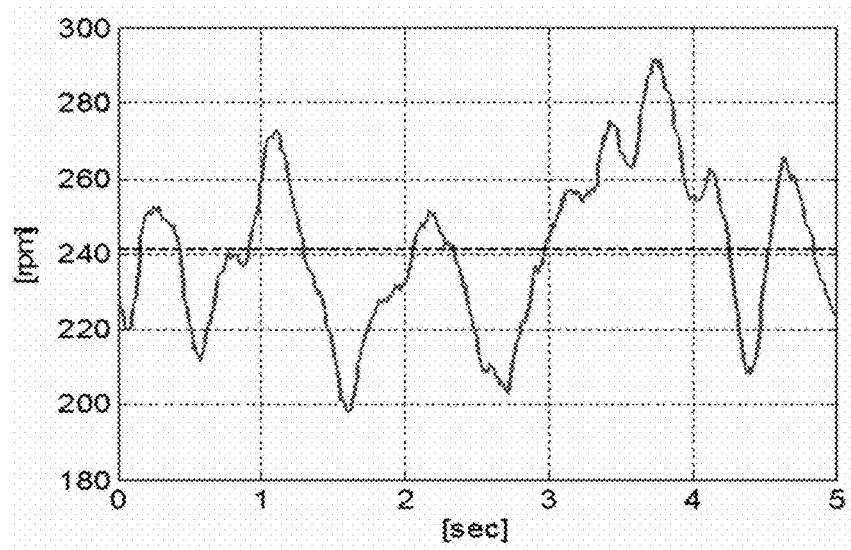
FIGS. 3, 4, and 5 illustrate results obtained by performing simulations using the torque ripple compensation apparatus in accordance with the torque ripple compensation apparatus shown in FIG. 1.

The ripple frequency generation unit 131 generates a ripple frequency (i.e. torque ripple frequency) using the motor speed (see the graph of FIG. 3).

The torque ripple frequency is set to a multiple $N_i$ of the motor speed where i=1, 2 . . . . That is because, since the ripple (i.e. torque ripple) generated by the motor is generated in response to the speed of the motor, the frequency of the ripple which occurs in the motor can be acquired as long as the motor speed is known.

At this time, the ripple frequency (i.e. torque ripple frequency $\omega_i^{(k)}$) is generated in each designated control period (for example, 1 ms).

The torque signal model application unit 133 generates a torque ripple estimated signal $\hat{q}(k)$ of the torque ripple frequency by applying a torque signal model $A_0$ to the torque ripple frequency.

The torque estimation unit 134 estimates torque from the generated torque ripple estimated signal $\hat{q}(k)$, and outputs the estimated torque.

The torque signal model $A_0$ a matrix model. Since an order is set when the matrix model $A_0$ is made, an offset, torque ripple 1 and torque ripple 2, may be distinguished according to the order.

The torque difference calculation unit 135 calculates a difference between the ripple torque $\hat{\tau}(k)$ estimated by the torque estimation unit 134 and the measured torque $\tau(k)$ measured by the torque measurement unit 110 by comparing the ripple torque $\hat{\tau}(k)$ and the measured torque $\tau(k)$, multiplies the calculated difference by a gain $L_0$ set by the gain setting unit 136 through the gain application unit 137, and outputs the multiplication result. The torque ripple element output unit 138 generates an estimated signal $\hat{q}(k)$ including all torque ripple elements (i.e. offset, torque ripple 1, and torque ripple 2) by applying the signal, to which the gain is applied by the gain application unit 137, to the estimated signal $\hat{q}(k)$.

The torque ripple element output unit 138 generates a corrected estimated signal $\bar{q}(k)$ by correcting the estimated signal $\hat{q}(k)$ using the measured torque $\tau(k)$ and feeds back the estimated signal $\bar{q}(k)$ to the torque signal model application unit 133, thereby reflecting the corrected estimated signal $\bar{q}(k)$ into the calculation of a torque ripple estimation value $\hat{\tau}_r(k)$.

For reference, the torque ripple estimation becomes fast when the gain $L_0$ multiplied through the gain application unit 137 is large, and becomes slow when the gain $L_0$ is small.

Hereafter, the configuration and operation of the control unit 130 will be described in more detail.

In the present exemplary embodiment, the measured torque signal $\tau$ is modeled with an offset and torque ripple as expressed by Equation 1 below.

$$\tau = \alpha_0 + \alpha_1 \sin(N_1\theta_m + \phi_1) + \ldots + \alpha_n \sin(N_n\theta_m + \phi_n) \quad \text{[Equation 1]}$$

In Equation 1, the constant represents the offset, and the trigonometrical function represents the torque ripple where i=1, 2, . . . , n.

The torque ripple model is expressed as a harmonic component $N_i\theta_m$ with respect to a motor rotation angle $\theta_m$ and $\alpha_i$ and $\phi_i$ represent the magnitude and phase of the torque ripple, respectively.

At this time, since the motor rotation angle $\theta_m$ can be measured, the heading angle $N_i\theta_m$ of the harmonic wave can be calculated, but the offset $\alpha_0$ and the magnitude $\alpha_i$ and phase $\phi_i$ of the torque ripple, which are unknown values, need to be estimated.

Thus, in the present exemplary embodiment, only the frequency $$\omega_i = \frac{dt}{d} N_i \theta_m$$

of the torque ripple in a state space may be used to perform offset separation and torque ripple compensation.

That is, a state variable indicating a state space model of the measured torque signal τ is defined as $q_0 = \alpha_0 q_i = [q_{is}, q_{ic}]^\tau$.

Here, $q_{is} = \alpha_i \sin(N_i \theta_m + \phi_i)$ and $$\frac{d}{dt} q_{is} = \omega_i \alpha_i \cos(N_i \theta_m + \phi_i) = \omega_i q_{ic}.$$

Furthermore, the frequency $\omega_i$ of the torque ripple is calculated as $$\omega_i = \frac{dt}{d} N_i \theta_m.$$

Thus, when the state variables $q_0$, $q_i$ are used, the measured torque signal of Equation 1 may be expressed as the state space module of Equation 2 below.

$$\frac{d}{dt} q_0 = 0, \ \frac{d}{dt} q_i = A_i q_i, \ A_i = \begin{bmatrix} 0 & \omega_i \\ -\omega_i & 0 \end{bmatrix},$$

$$C = [1 \ 0]$$

$$q = \begin{bmatrix} q_0 \\ q_1 \\ \vdots \\ q_n \end{bmatrix}, \ \frac{d}{dt} q = \begin{bmatrix} 0 & 0 & 0 & 0 \\ 0 & A_1 & 0 & 0 \\ 0 & 0 & \ddots & 0 \\ 0 & 0 & 0 & A_n \end{bmatrix} q,$$

$$\tau = [1 \ C \ \ldots \ C] q \quad \text{[Equation 2]}$$

In the present exemplary embodiment, the torque ripple estimation logic is designed in consideration of digital control.

The continuous time model of Equation 2 may be discretized as expressed by Equation 3 below through a zero order hold method.

$$\exp(A_i T) = \begin{bmatrix} \cos(T\omega_i(k)) & \sin(T\omega_i(k)) \\ -\sin(T\omega_i(k)) & \cos(T\omega_i(k)) \end{bmatrix}$$

$$q(k+1) = \begin{bmatrix} 1 & 0 & 0 & 0 \\ 0 & \exp(A_1 T) & 0 & 0 \\ 0 & 0 & \ddots & 0 \\ 0 & 0 & 0 & \exp(A_n T) \end{bmatrix}$$

$$q(k) := A_0 q(k)$$

$$\tau(k) = [1 \ C \ \ldots \ C] q(k) := C_0 q(k) \quad \text{[Equation 3]}$$

In Equation 3, T represents a control period, and k represents a point of time at which t=kT, where k=0, 1, 2, . . . , ∞. The measured torque signal τ(k) and the ripple frequency $\omega_i(k)$ are sampled in each control period T.

In the present exemplary embodiment, the torque estimation unit 134 uses an estimation method of Equation 4 below in order to separate the offset from the torque signal and to estimate the torque ripple.

$$\hat{q}(k) = A_0 \bar{q}(k-1)$$

$$\hat{\tau}(k) = C_0 \hat{q}(k)$$

$$\bar{q}(k) = \hat{q}(k) + L_0(\tau(k) - \hat{\tau}(k))$$

$$\hat{\tau}_r(k) = [0 C \ \ldots \ C] \bar{q}(k) \quad \text{[Equation 4]}$$

First, the torque estimation unit 134 generates the estimated signal $\hat{q}(k)$ using the torque signal model $A_0$.

Since the order is set when the matrix model $A_0$ is made, the offset, the torque ripple 1, and the torque ripple 2 may be distinguished according to the set order.

Then, the torque estimation unit 134 generates a corrected estimated signal $\bar{q}(k)$ by correcting the estimated signal $\hat{q}(k)$ using the measured torque signal τk).

Then, the torque estimation unit 134 calculates a torque ripple estimation value $\hat{\tau}_r(k)$ from the corrected estimated signal $\bar{q}(k)$.

At this time, the gain $L_0$ of the torque estimation unit 134 is updated in a sequence expressed as Equation 5 below.

$$P = A_0 \bar{P}(k-1) A_0^T + Q$$

$$L_0(k) = P C_0^T (R^{-1} + C_0 P C_0^T)^{-1}$$

$$\bar{P}(k) = (I - L_0 C_0) P \quad \text{[Equation 5]}$$

In Equation 5, the matrices Q and R are elements for deciding the performance of the torque estimation unit 134. Furthermore, the matrices P and $\bar{P}$ are elements for calculating the gain $L_0$ for the given matrices Q and R. Furthermore, the matrix I represents a unit matrix.

Figure 4:
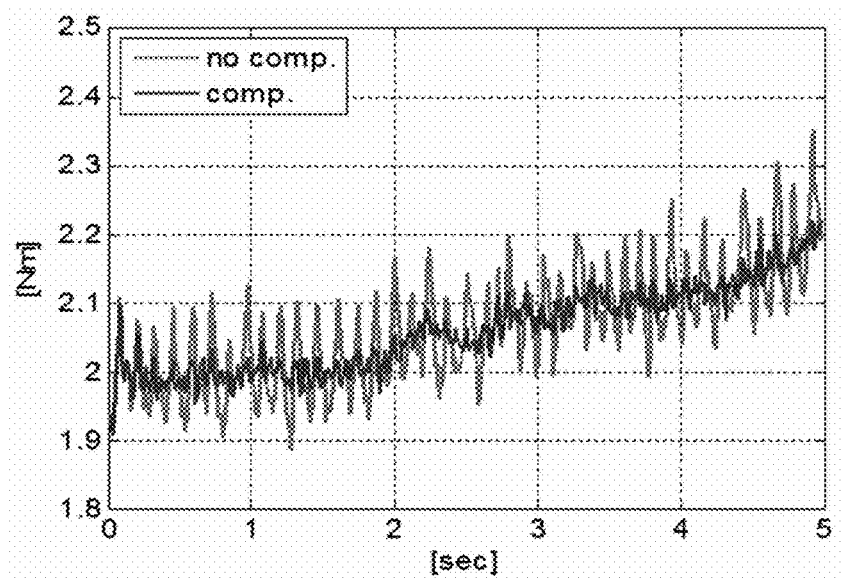
Figure 5:
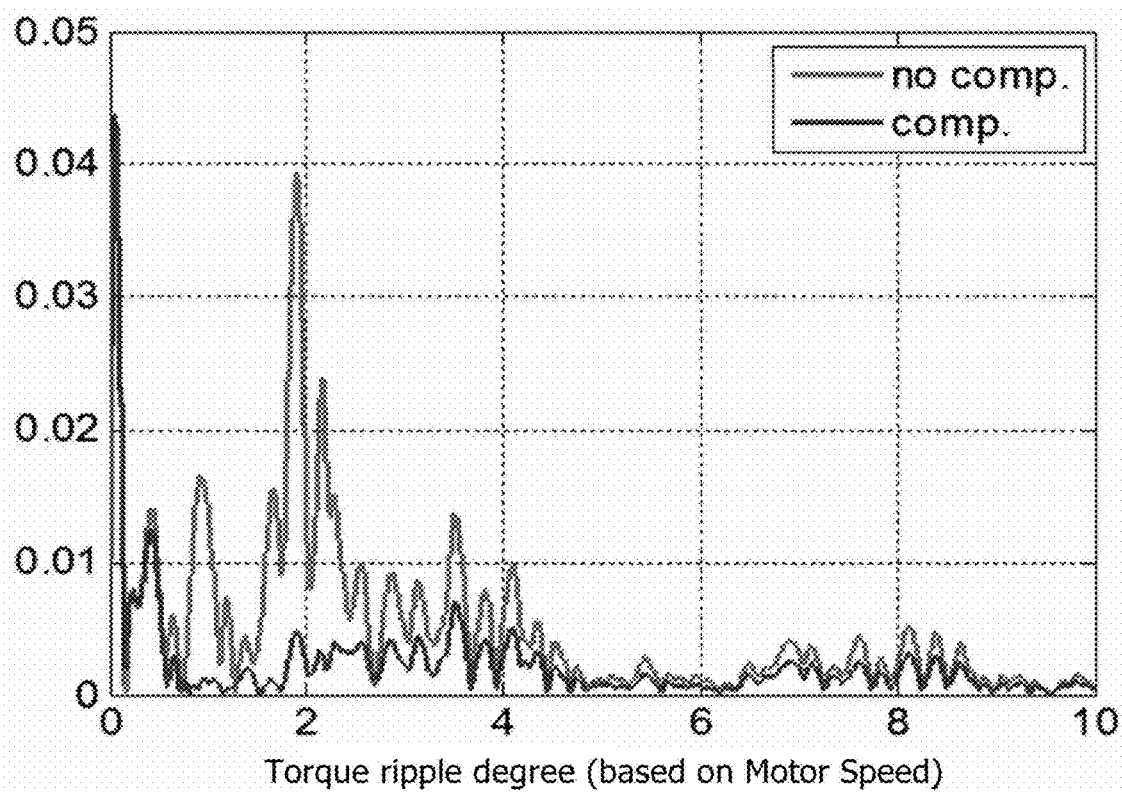

FIGS. 3 to 5 illustrate results obtained by performing simulations using the torque ripple compensation apparatus in accordance with the exemplary embodiment of the present invention shown in FIG. 1. FIG. 3 is a graph illustrating motor speed, and the ripple frequency generation unit 131 of the control unit 130 generates a torque ripple frequency using the motor speed.

FIG. 4 is a graph illustrating torque data before/after torque ripple compensation, and FIG. 5 is a graph illustrating a frequency analysis result for the torque data.

FIGS. 4 and 5 show that the primary torque ripple and the secondary torque ripple are significantly reduced, when the graph (gray-line graph) before compensation and the graph (dark-line graph) after compensation are compared.

In the present exemplary embodiment, the torque ripple compensation apparatus and method can reduce torque ripple which occurs when the motor of the MDPS system of the vehicle is driven, and improve a steering feel at low speed through the torque ripple compensation.

Although exemplary embodiments of the present invention have been disclosed for illustrative purposes, those skilled in the art will appreciate that various modifications, additions and substitutions are possible, without departing from the scope and spirit of the disclosure as defined in the accompanying claims. Thus, the true technical scope of the present invention should be defined by the following claims.

What is claimed is:

1. A torque ripple compensation apparatus comprising:
   a torque measurement unit configured to output torque measured through a torque sensor of an MDPS (Motor Driven Power Steering) system;
   a motor speed measurement unit configured to output motor speed measured through a position sensor of an MDPS motor;

a control unit configured to separately output an offset signal and a torque ripple signal based on the motor speed information and the measured torque information; and a torque ripple compensation unit configured to synthesize a plurality of torque ripple signals outputted from the control unit, and output a torque ripple compensation signal as a motor control signal to the MDPS motor, the torque ripple compensation signal being used to compensate for the synthesized torque ripple signal, wherein the control unit comprises:

a ripple frequency generation unit configured to generate a torque ripple frequency using the motor speed;

a torque signal model application unit configured to generate a torque ripple estimated signal of the torque ripple frequency by applying a torque signal model to the torque ripple frequency;

a torque estimation unit configured to estimate ripple torque from the generated torque ripple estimated signal, and output the estimated ripple torque;

a torque difference calculation unit configured to calculate a difference between the ripple torque estimated by the torque estimation unit and the measured torque acquired by the torque measurement unit by comparing the ripple torque and the measured torque;

a gain application unit configured to multiply a gain set by a gain setting unit by the calculated torque difference, and output the multiplication result as a gain-applied signal; and a torque ripple element output unit configured to apply the gain-applied signal to the torque ripple estimated signal, and generate a corrected estimated signal including all torque ripple elements.

2. The torque ripple compensation apparatus of claim 1, wherein the torque ripple signal comprises at least a primary torque ripple signal and a secondary torque ripple signal.

3. The torque ripple compensation apparatus of claim 1, wherein the measured torque signal and the ripple frequency are sampled and generated in each designated control period.

4. The torque ripple compensation apparatus of claim 1, wherein the torque signal model is a matrix model, and an offset, torque ripple 1, and torque ripple 2 are distinguished according to an order which is set when the matrix model is made.

5. The torque ripple compensation apparatus of claim 1, wherein the torque ripple element comprises an offset, torque ripple 1, and torque ripple 2.

6. The torque ripple compensation apparatus of claim 1, wherein the torque ripple compensation apparatus feeds back the corrected estimated signal to the torque signal model application unit in order to reflect the corrected estimated signal into the calculating of a torque estimation value.

7. A torque ripple compensation method comprising:

outputting torque measured through a torque sensor of an MDPS system;

outputting motor speed measured through a position sensor of an MDPS motor;

separately outputting, by a control unit, an offset signal and a torque ripple signal based on the motor speed information and the measured torque information; and synthesizing, by a torque ripple compensation unit, a plurality of torque ripple signals outputted from the control unit, and outputting a torque ripple compensation signal as a motor control signal to the MDPS motor, the torque ripple compensation signal being used to compensate for the synthesized torque ripple signal, wherein the separately outputting of the offset signal and the torque ripple signal comprises, by the control unit:

generating a torque ripple frequency using the motor speed;

generating a torque ripple estimated signal of the torque ripple frequency by applying a torque signal model to the torque ripple frequency;

estimating ripple torque from the generated torque ripple estimated signal, and outputting the estimated ripple torque;

calculating a difference between the estimated ripple torque and the measured torque by comparing the estimated ripple torque and the measured torque;

multiplying a preset gain by the calculated torque difference, and outputting the multiplication result as a gain-applied signal; and generating a corrected estimated signal including all torque ripple elements by applying the gain-applied signal to the torque ripple estimated signal.

8. The torque ripple compensation method of claim 7, wherein the torque signal model is a matrix model, and an offset, torque ripple 1, and torque ripple 2 are distinguished according to an order which is set when the matrix model is made.

9. The torque ripple compensation method of claim 7, wherein the torque ripple elements comprise an offset, torque ripple 1, and torque ripple 2.

10. The torque ripple compensation method of claim 7, further comprising feeding back the corrected estimated signal to the applying of the torque signal model to the torque ripple frequency, in order to reflect the corrected estimated signal to calculation of a torque estimation value.

11. The torque ripple compensation method of claim 7, wherein the measured torque signal $\tau$ is modeled with an offset and torque ripple as expressed by Equation 1 below:

$$\tau = \alpha_0 + \alpha_1 \sin(N_1\theta_m + \phi_1) + \ldots + \alpha_n \sin(N_n\theta_m + \phi_n)$$

where a constant $\alpha_0$ represents the offset, a trigonometrical function $\alpha_i \sin(N_i\theta_m + \phi_i)$ represents the torque ripple where i=1, 2, ..., n, $\theta_m$ represent a motor rotation angle, $N_i\theta_m$ represent a harmonic component with respect to the motor rotation angle, and $\alpha_i$ and $\phi_i$ represent the magnitude and phase of the torque ripple, respectively.

12. The torque ripple compensation method of claim 7, wherein the measured torque signal and the ripple frequency are sampled and generated in each designated control period.

* * * * *